US012287081B2

(12) United States Patent
Chen

(10) Patent No.: US 12,287,081 B2
(45) Date of Patent: Apr. 29, 2025

(54) SYSTEMS AND METHODS FOR PROVIDING LIGHTING USING MODULAR HEAT SINK STRUCTURES AND LENSES

(71) Applicant: SIGNIFY HOLDING B.V., Eindhoven (NL)

(72) Inventor: Ling Chen, Peachtree City, GA (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/555,889

(22) PCT Filed: Apr. 11, 2022

(86) PCT No.: PCT/EP2022/059571
§ 371 (c)(1),
(2) Date: Oct. 18, 2023

(87) PCT Pub. No.: WO2022/223335
PCT Pub. Date: Oct. 27, 2022

(65) Prior Publication Data

US 2024/0384866 A1 Nov. 21, 2024

Related U.S. Application Data

(60) Provisional application No. 63/176,403, filed on Apr. 19, 2021.

(30) Foreign Application Priority Data

Apr. 29, 2021 (EP) .................................... 21171251

(51) Int. Cl.
*F21V 29/83* (2015.01)
*F21V 5/00* (2018.01)
(Continued)

(52) U.S. Cl.
CPC .............. *F21V 29/83* (2015.01); *F21V 5/007* (2013.01); *F21Y 2105/18* (2016.08); *F21Y 2115/10* (2016.08)

(58) Field of Classification Search
CPC ...... F21V 29/83; F21V 5/007; F21Y 2105/18; F21Y 2115/10; F21S 8/04
See application file for complete search history.

(56) References Cited

U.S. PATENT DOCUMENTS

2015/0070911 A1* 3/2015 Kim ........................ F21V 29/83
362/373
2016/0047538 A1* 2/2016 Peck .................... F21V 31/005
362/249.02

(Continued)

FOREIGN PATENT DOCUMENTS

| | | | |
|---|---|---|---|
| EP | 4237743 | A1 | 9/2023 |
| JP | 2014017229 | A | 1/2014 |
| KR | 101888189 | B1 * | 8/2018 |

*Primary Examiner* — Erin Kryukova

(57) ABSTRACT

A light fixture (50), comprising: an electronics housing (51); first and second heat sink structures (52, 54, 56, 58, 60, 62) coupled to the electronics housing, wherein each heat sink structure of the first and second heat sink structures is defined at least in part by a heat sink outer arc (64) having first and second end points (72, 74), and wherein each heat sink structure is further defined at least in part by two heat sink radii (66, 68) extending from the first and second end points, respectively, to a center point (P) of the light fixture; first and second light sources (53); at least two lenses (106, 108, 110, 112, 114, 116) comprising a first lens attached to the first heat sink structure and covering the first light source and a second lens attached to the second heat sink structure and covering the second light source, wherein each lens of the first and second lenses is defined at least in part by a lens outer arc (120) having first and second end points (128, 130), wherein each lens is further defined at least in part by two
(Continued)

lens radii (122, 124) extending from the first and second end points, respectively, to a point (PI) that is different than the center point of the light fixture, and wherein each lens is further defined at least in part by an inner arc (126) extending between the two lens radii (122, 124); and a ventilation channel (76, 78, 80, 82, 84, 86) arranged between the first and second heat sink structures.

11 Claims, 7 Drawing Sheets

(51) Int. Cl.
*F21Y 105/18* (2016.01)
*F21Y 115/10* (2016.01)

(56) References Cited

U.S. PATENT DOCUMENTS

2018/0320856 A1* 11/2018 Romano ............... F21V 17/002
2020/0200378 A1* 6/2020 Stokes .................. F21V 29/745

* cited by examiner

SYSTEMS AND METHODS FOR PROVIDING LIGHTING USING MODULAR HEAT SINK STRUCTURES AND LENSES

CROSS-REFERENCE TO PRIOR APPLICATIONS

This application is the U.S. National Phase application under 35 U.S.C. § 371 of International Application No. PCT/EP2022/059571, filed on Apr. 11, 2022, which claims the benefit of U.S. Provisional Patent Application No. 63/176,403, filed on Apr. 19, 2021 and European Patent application Ser. No. 21/171,251.8, filed on Apr. 29, 2021. These applications are hereby incorporated by reference herein.

FIELD OF THE DISCLOSURE

The present disclosure is directed generally to systems and methods for providing high output lighting using thermal management structures and lenses that are modular.

BACKGROUND

Some high bay light fixtures include modular heat sink structures that create gaps between the optical lenses. The gaps or channels create necessary ventilation paths that allow heat that is generated by the light sources to flow upward away from the heat sink structures. The optical lenses within these light fixtures are typically concentrically arranged relative to a center of the fixture to provide 360 degree coverage. Such high bay light fixtures that include arcuate arrays of light emitting diodes (LEDs) with an optic lens for each LED are configured to provide uniform task plane lighting. Unfortunately, the gaps created by modular heat sink structures of high bay light fixtures can separate colors and cast shadows on task plane lighting. This is particularly true when the light fixture includes one or more arcuate arrays of LEDs and at least one ring optic lens that is shared by at least two LEDs.

There is a need in the art for improved systems and methods for providing uniform lighting with high output lighting fixtures that feature modular heat sink structures and lenses.

SUMMARY OF THE INVENTION

The present disclosure is directed generally to lenses or optical elements for high output lighting fixtures and high output lighting fixtures including improved lenses or optical elements. Exemplary high output light fixtures include modular heat sink structures that are separated by ventilation channels. Generally, embodiments of the present disclosure are directed to improved lenses or optical elements for such high output light fixtures where the improved lenses or optical elements are non-concentrically arranged within the fixture. Applicant has recognized and appreciated that high bay light fixtures including modular heat sink structures with ventilation channels can separate colors and create shadows on task plane lighting. Advantageously, the systems and methods described herein generate task plane lighting without color separation or shadows without reducing LED counts and without adding cost.

Generally, in one aspect, a light fixture is provided. The light fixture includes an electronics housing and first and second heat sink structures coupled to the electronics housing, wherein each heat sink structure of the first and second heat sink structures is defined at least in part by a heat sink outer arc having first and second end points, and wherein each heat sink structure is further defined at least in part by two heat sink radii extending from the first and second end points, respectively, to a center point of the light fixture. The light fixture further includes first and second light sources and at least two lenses having a first lens attached to the first heat sink structure and covering the first light source and a second lens attached to the second heat sink structure and covering the second light source. Each lens of the first and second lenses is defined at least in part by a lens outer arc having first and second end points, and two lens radii extending from the first and second end points, respectively, to a point that is different than the center point of the light fixture. The light fixture further includes a ventilation channel arranged between the first and second heat sink structures.

In embodiments, each lens of the at least two lenses is further defined at least in part by an inner arc extending between the two lens radii.

In embodiments, the point that is different than the center point of the light fixture is arranged along an imaginary line connecting the center point of the light fixture to a midpoint of the inner arc.

In embodiments, the first lens is non-concentric with the first heat sink structure.

In embodiments, the second lens is non-concentric with the second heat sink structure.

In embodiments, the first or second lens is non-concentric with the light fixture.

In embodiments, the first lens is attached to a first base of the first heat sink structure on a first surface that faces away from the electronics housing and the second lens is attached to a second base of the second heat sink structure on a second surface that faces away from the electronics housing.

In embodiments, the point is radially outward of the center point of the light fixture.

Generally, in another aspect, a method for manufacturing a light fixture is provided. The method includes providing an electronics housing and coupling first and second heat sink structures to the electronics housing, wherein each heat sink structure of the first and second heat sink structures is defined at least in part by a heat sink outer arc having first and second end points, wherein each heat sink structure is further defined at least in part by two heat sink radii extending from the first and second end points, respectively, to a center point of the light fixture. The method further includes providing first and second light sources, attaching a first lens to the first heat sink structure and covering the first light source; and attaching a second lens to the second heat sink structure and covering the second light source. Each lens of the first and second lenses is defined at least in part by a lens outer arc having first and second end points, and wherein each lens is further defined at least in part by two lens radii extending from the first and second end points, respectively, to a point that is different than the center point of the light fixture. The method further includes providing a ventilation channel between the first and second heat sink structures.

In embodiments, the first lens or the second lens is further defined at least in part by an inner arc extending between the two lens radii.

In embodiments, the point that is different than the center point of the light fixture is arranged along an imaginary line connecting the center point of the light fixture to a midpoint of the inner arc.

In embodiments, the first lens is non-concentric with the first heat sink structure and the second lens is non-concentric with the second heat sink structure.

In embodiments, the first or second lens is non-concentric with the light fixture.

In embodiments, the first lens is attached to a first base of the first heat sink structure on a first surface that faces away from the electronics housing and the second lens is attached to a second base of the second heat sink structure on a second surface that faces away from the electronics housing.

In embodiments, the point that is different than the center point of the light fixture is radially outward of the center point of the light fixture.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the present disclosure.

DETAILED DESCRIPTION OF EMBODIMENTS

The present disclosure describes various embodiments of improved systems and methods for providing task plane lighting with high output light fixtures having modular heat sink structures. While some high output light fixtures with modular heat sink structures include arrays of LEDs and an optic lens for each LED, these light fixtures provide task plane lighting without shadows regardless of whether they are configured to generate narrow or wide beams. Applicant has recognized and appreciated that high output light fixtures that have modular heat sink structures, arrays of LEDs, and concentric ring lenses that are shared by multiple LEDs can generate task plane lighting with shadows that are cast by gaps between the lenses. Applicant has further recognized and appreciated that it would be beneficial to modify the ring lens structure relative to the other components of the light fixture to generate task plane lighting without shadows.

The term "light fixture" as used herein refers to an implementation or arrangement of one or more lighting units in a particular form factor, assembly, or package. The lighting units refer to an apparatus including one or more light sources of the same or different types and other components (e.g., thermal management structures, light directing structures, etc.) if applicable. A given light fixture may have any one of a variety of mounting arrangements for the light source(s), enclosure/housing arrangements and shapes, and/or electrical and mechanical connection configurations. Additionally, a given light fixture optionally may be associated with (e.g., include, be coupled to and/or packaged together with) various other components (e.g., control circuitry) relating to the operation of the light source(s).

Figure 1:
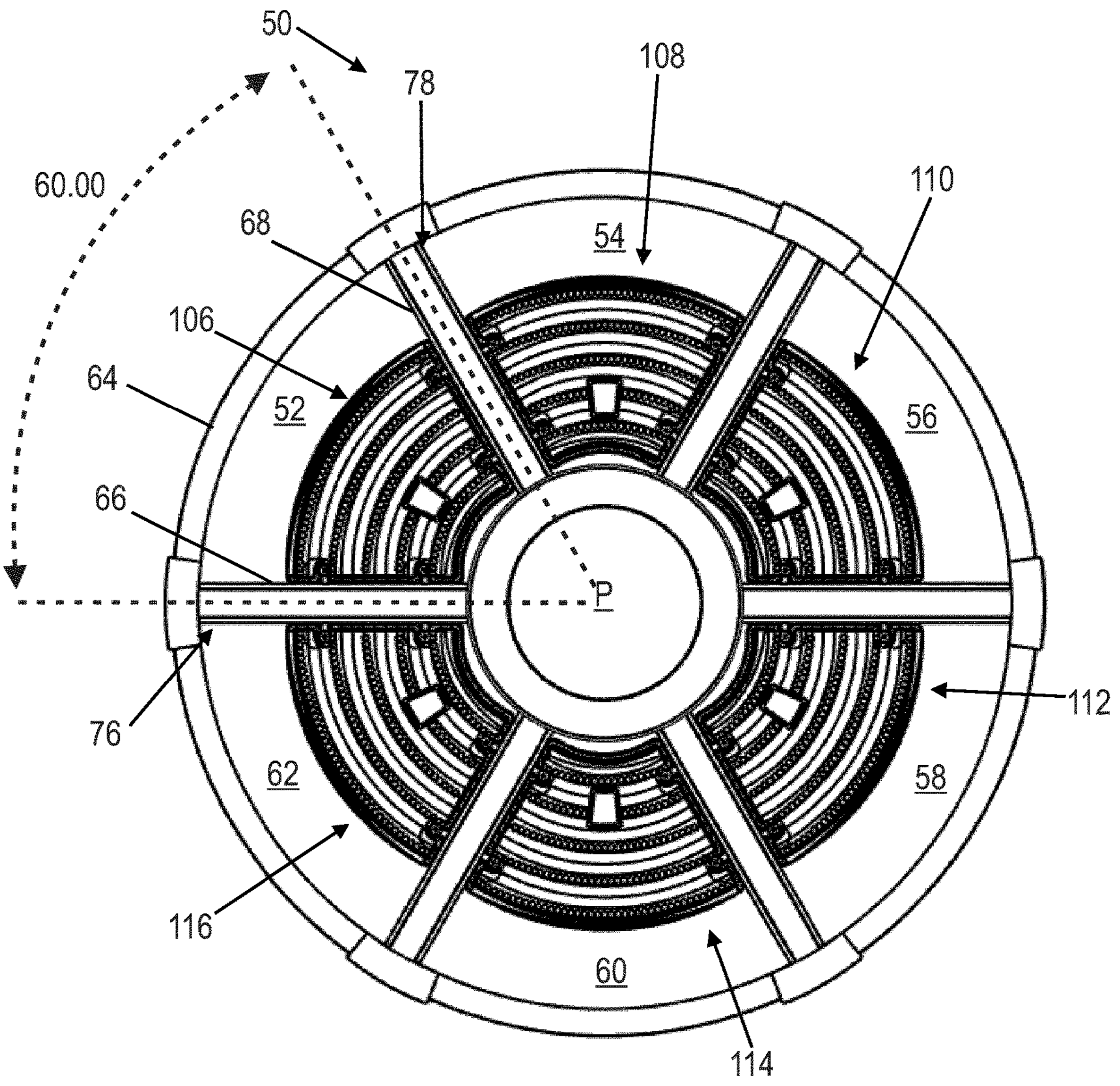
FIG. 1 illustrates an example bottom view of a high output light fixture including at least two modular heat sink structures and at least two optic lenses, one optic lens for each modular heat sink structure, according to aspects of the present disclosure.
Figure 6:
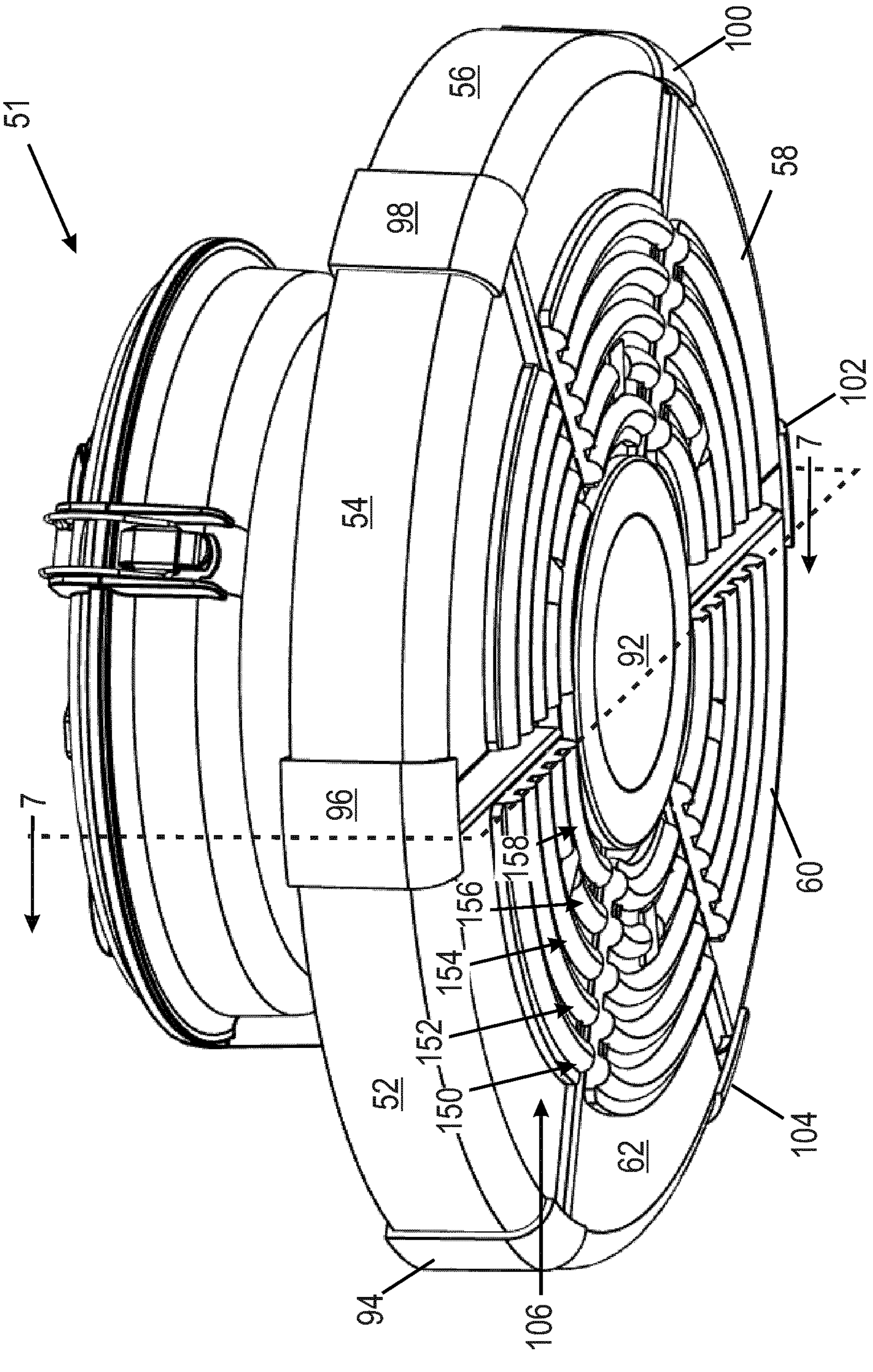
FIG. 6 is an example bottom perspective view of a high output light fixture, according to aspects of the present disclosure.
Figure 7:
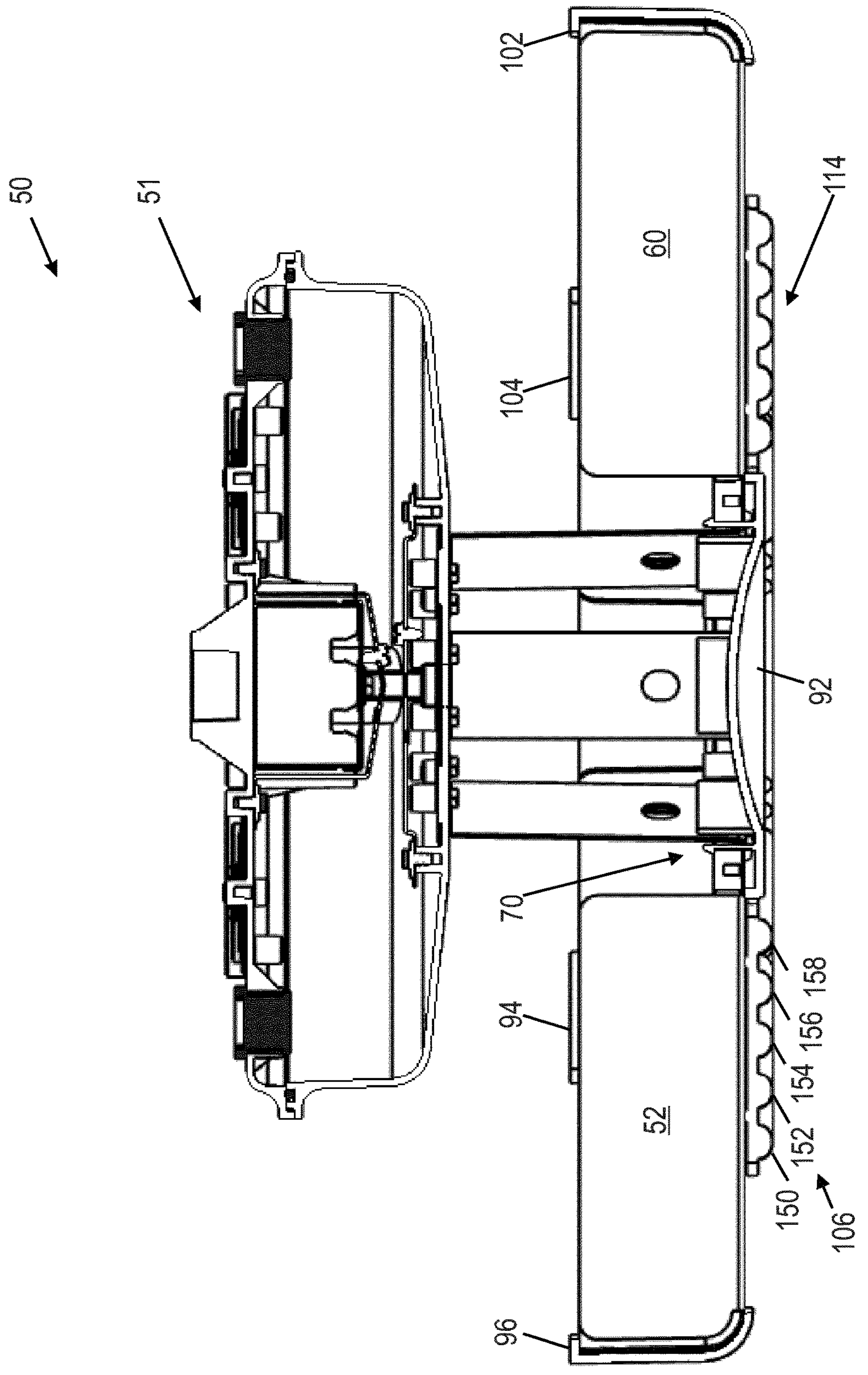
FIG. 7 shows an example cross-sectional view of a high output light fixture taken generally along line 7-7 in FIG. 6, according to aspects of the present disclosure.

Referring to FIG. 1, an example bottom view of a high output light fixture 50 is shown. High output light fixtures (i.e., high bay light fixtures) generally refer to those fixtures hung at heights that are higher than twelve feet and those fixtures that produce at least approximately 10,000 lumens of light. Although not visible in FIG. 1, high output light fixture 50 includes an electronics housing that contains electrical components such as a LED driver, a power supply unit, a communication module, etc. Electronics housing 51 is shown in FIGS. 6 and 7. As described herein, high output light fixture 50 includes at least two modular heat sink structures and at least two optic lenses, one optic lens for each modular heat sink structure. Each of the at least two modular heat sink structures can be fixedly secured to the electronics housing. Each of the at least two optic lenses is secured to a modular heat sink structure. In the exemplary high output light fixture 50 shown in FIG. 1, six heat sink structures 52, 54, 56, 58, 60, and 62 are depicted. While six heat sink structures are illustrated, it should be appreciated that an exemplary high output light fixture could also include four heat sink structures, three heat sink structures, or even two heat sink structures. Exemplary high output light fixtures could also include more than six heat sink structures. Any suitable number of modular heat sink structures are contemplated.

Figure 2:
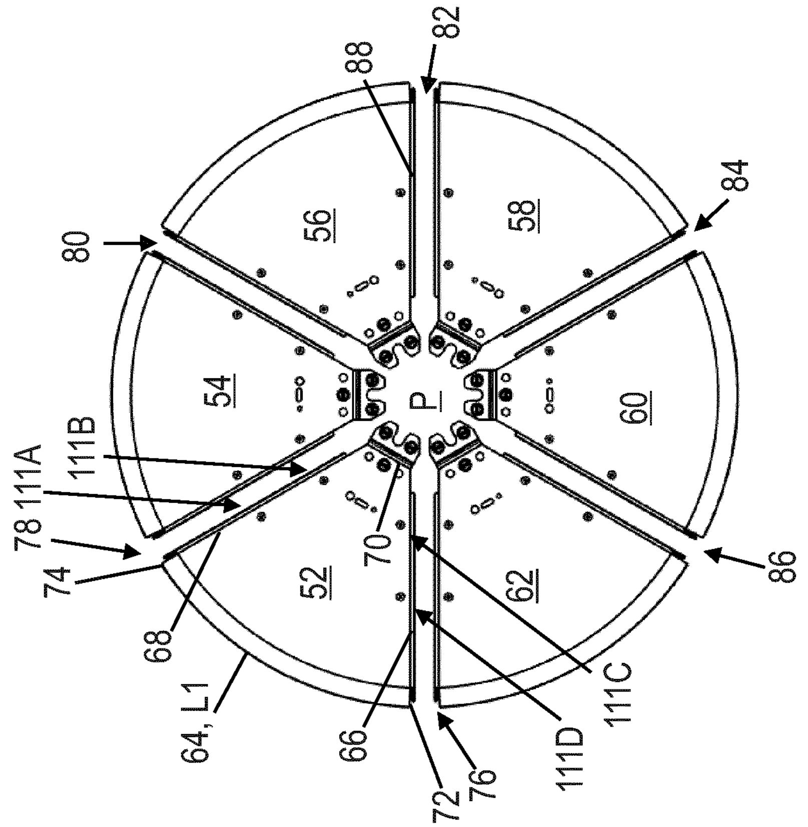
FIG. 2 illustrates an example bottom view of the modular heat sink structures of the high output light fixture of FIG. 1, according to aspects of the present disclosure.

Heat sink structures 52, 54, 56, 58, 60, and 62 are also depicted in FIG. 2. The base of each of the modular heat sink structures is defined by a heat sink outer arc, heat sink radii, and a heat sink inner arc or segment. Thus, the base of heat sink structure 52 is defined by heat sink outer arc 64, first heat sink radius 66, second heat sink radius 68, and inner arc or segment 70. Heat sink outer arc 64 comprises end points 72 and 74 and an arc length L1 between end points 72 and 74. First heat sink radius 66 extends from end point 72 toward center point P of the light fixture 50. Second heat sink radius 68 extends from end point 74 toward center point P of the light fixture 50. The base of each heat sink structure includes an outer arc to match the shape of the overall light fixture 50. Thus, it should be appreciated that the base of each heat sink structure can be modified to form any suitable outer perimeter to match any suitable shape of an overall light fixture. In embodiments, heat sink structures 52, 54, 56, 58, 60, and 62 are made from aluminum sheet metal using a method such as stamping. However, any suitable alternative materials and methods are contemplated.

As shown in FIGS. 1, 5, 6, and 7, each heat sink structure includes a surface upon which the light sources and lenses are mounted. The surfaces supporting the light sources and lenses are facing away from the electronics housing. Each heat sink structure also includes an upward-facing surface opposite the surface supporting the light sources and lenses. The base of each heat sink structure can further include one or more side walls extending upwardly from the edges of the base toward the electronics housing. In FIG. 1, such side walls would be extending into the page; thus, they are not visible. Such side walls are visible in FIGS. 6 and 7. In embodiments, a side wall or part of a side wall extends upwardly from the inner arc or segment 70 to be secured to the electronics housing. In the embodiments depicted in FIGS. 6 and 7, the side wall of heat sink structure 52 that contacts electronics housing 51 is taller than other side walls extending upwardly from the base of heat sink structure 52. As shown in FIG. 7, the base of each of the modular heat sink structures is spaced apart from the electronics housing 51. The distance between the base of each of the at least two modular heat sink structures and the electronics housing 51 depends on the height of the one or more connecting side walls and the angle at which the one or more connecting side walls are arranged between the base and the electronics housing 51. This distance allows for air to pass between the heat sink structures and the electronics housing to reduce the temperatures of the heat sink structures when in use. In embodiments, electronics housing 51 is made from aluminum using a method, such as, die casting. However, any suitable alternative material(s) and method(s) are contemplated.

Channels 76 and 78 are arranged along first and second heat sink radii 66 and 68, respectively, such that modular heat sink structure 52 is not in directly contact with modular heat sink structure 54 or modular heat sink structure 62 circumferentially about center point P. Channels 76 and 78 provide paths for air to flow upward between the one or more side walls of adjacent modular heat sink structures. In the illustrated embodiment of light fixture 50 having six modular heat sink structures, an additional channel 80 is provided between modular heat sink structures 54 and 56, an additional channel 82 is provided between modular heat sink structures 56 and 58, an additional channel 84 is provided between modular heat sink structures 58 and 60, and an additional channel 86 is provided between modular heat sink structures 60 and 62. The outer arcs of the modular heat sink structures 52, 54, 56, 58, 60), and 62 together with the channels 76, 78, 80, 82, 84, and 86 form the full circumference of light fixture 50. The distance from the midpoint of channel 76, along the outer arc 64, and to the midpoint of channel 78 forms one sixth or 60 degrees of the circumference of light fixture 50 as shown in FIG. 1. Each of the other modular heat sink structures, when taken together with their channels, form the other five sixths or 300 degrees of the circumference of light fixture 50.

In embodiments with only two modular heat sink structures, a first modular heat sink structure could be defined by first heat sink radius 66, second heat sink radius 88, an outer arc connecting the outer-most end points of the first heat sink radius 66 and the second heat sink radius 88, and an inner arc or segment extending between the inner-most end points of the first heat sink radius 66 and the second heat sink radius 88. Heat sink radius 88 is shown in FIG. 2. Channels 78 and 80 could be dispensed with to form the first modular heat sink structure. In other words, heat sink structures 52, 54, and 56 could be combined to form a first modular heat sink structure. The outer arc of the first module heat sink structure together with half of channels 76 and 82 could form half the circumference of a light fixture including only two modular heat sink structures. The second modular heat sink structure of an embodiment having only two modular heat sink structures could have the same structure as the first modular heat sink structure to form the second half of the light fixture with the other half of channels 76 and 82. The second modular heat sink structure would be a mirror image of the first modular heat sink structure. In embodiments, light fixture 50 includes cap 92 and channel cover pieces 94, 96, 98, 100, 102, and 104. In embodiments, cap 92 and channel cover pieces 94, 96, 98, 100, 102, and 104 can be made of any suitable plastic or combination of plastics and may be, for example, snapped onto the heat sink structures 52, 54, 56, 58, 60, and 62.

Figure 3:
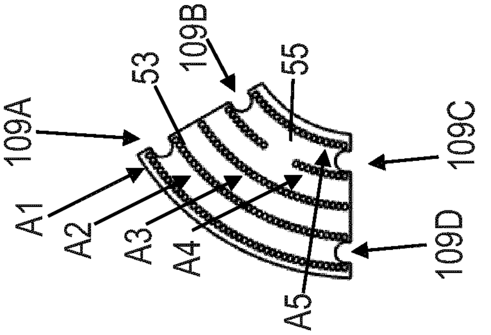
FIG. 3 shows an example light source for one of the modular heat sink structures of FIG. 2, according to aspects of the present disclosure.

High output light fixture 50 further includes at least two light sources that are attached to the modular heat sink structures. In the embodiment shown in FIG. 1 including six heat sink structures, at least one light source is provided for modular heat sink structure 52, at least one light source is provided for modular heat sink structure 54, at least one light source is provided for modular heat sink structure 56, at least one light source is provided for modular heat sink structure 58, at least one light source is provided for modular heat sink structure 60, and at least one light source is provided for modular heat sink structure 62. Each of the light sources 53 (shown in FIG. 3) can be attached to a respective heat sink structure using thermal tape or any suitable alternative. As shown in FIG. 3, each light source 53 can include light emitting diodes (LEDs) that are disposed on a printed circuit board (PCB) 55. The LEDs are configured to be driven to emit light of a particular character (i.e., color intensity and color temperature) by one or more light source drivers. The LEDs may be active (i.e., turned on); inactive (i.e., turned off); or dimmed by a factor d, where $0 \leq d \leq 1$. The value $d=0$ means that the LED is turned off whereas $d=1$ represents an LED that is at its maximum illumination. The LEDs can be embodied as arcuate arrays of LEDs. For example, the light sources 53 in FIG. 3 are arranged along five arc A1, A2, A3, A4, and A5. However, it should be appreciated that any suitable arrangement is contemplated. In embodiments including four heat sink structures, at least one light source is provided for each of the four heat sink structures. In embodiments including only two heat sink structures, a first light source is provided for a first heat sink structure and a second light source is provided for a second heat sink structure. The light source 53 comprising arcuate arrays of LEDs and PCB 55 shown in FIG. 3 can be attached to heat sink structure 52.

Figure 4:
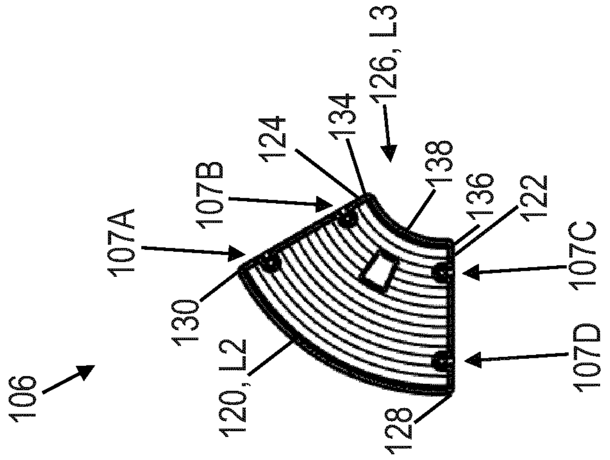
FIG. 4 shows an example top view of a lens for the example light source of FIG. 3, according to aspects of the present disclosure.

High output light fixture 50 further includes at least two lenses that are attached to the modular heat sink structures and covering the light sources. The lenses are configured to collimate the light rays from the LEDs into a particular controlled beam that will provide the desired intensity of light to the area to be covered. In the embodiment shown in FIGS. 1 and 5 including six heat sink structures, at least one lens 106 is provided for modular heat sink structure 52, at least one lens 108 is provided for modular heat sink structure 54, at least one lens 110 is provided for modular heat sink structure 56, at least one lens 112 is provided for modular heat sink structure 58, at least one lens 114 is provided for modular heat sink structure 60, and at least one lens 116 is provided for modular heat sink structure 62. Each of the lenses 106, 108, 110, 112, 114, and 116 can be attached to a respective heat sink structure using fasteners or any suitable alternative. FIG. 4 shows lens 106 which can be attached to modular heat sink structure 52 on top of light source 53 and PCB 55. In embodiments, lens 106 is attached to a surface of the base of modular heat sink structure 52 that faces away from the electronics housing 51. The four openings 107A, 107B, 107C, and 107D in lens 106 can be configured to receive fasteners that can extend through openings 109A, 109B, 109C, and 109D in PCB 55 (in FIG. 3). The same fasteners can extend through openings 111A, 111B, 111C, and 111D in heat sink structure 52. Although the figures show four openings in lens 106, PCB 55, and heat sink structure 52, it should be appreciated that any number of openings can be included to accommodate any number of fasteners. Since light source 52 is positioned between lens 106 and heat sink structure 52, attachment of lens 106 to heat sink structure 52 using fasteners also retains light source 53 in contact with heat sink structure 52. The same holds true for the light sources and lenses that are attached to heat sink structures 54, 56, 68, 60), and 62. In embodiments including four heat sink structures, at least one lens is provided for each of the four heat sink structures. In embodiments including only two heat sink structures, a first lens is provided for a first heat sink structure and a second lens is provided for a second heat sink structure. In embodiments, each of the lenses are unitary elements that are made of molded transparent plastic material. In embodiments, each of the lenses are formed of optical grade silicone and may be pliable or elastic. In other embodiments, each of the lenses are formed of an optical grade plastic such as poly-methyl-methacrylate ("PMMA"), polycarbonate, or any suitable acrylic or any other suitable material or combination of materials. In embodiments, each of the lenses include prismatic elements to direct the rays from the LEDs.

Figure 5:
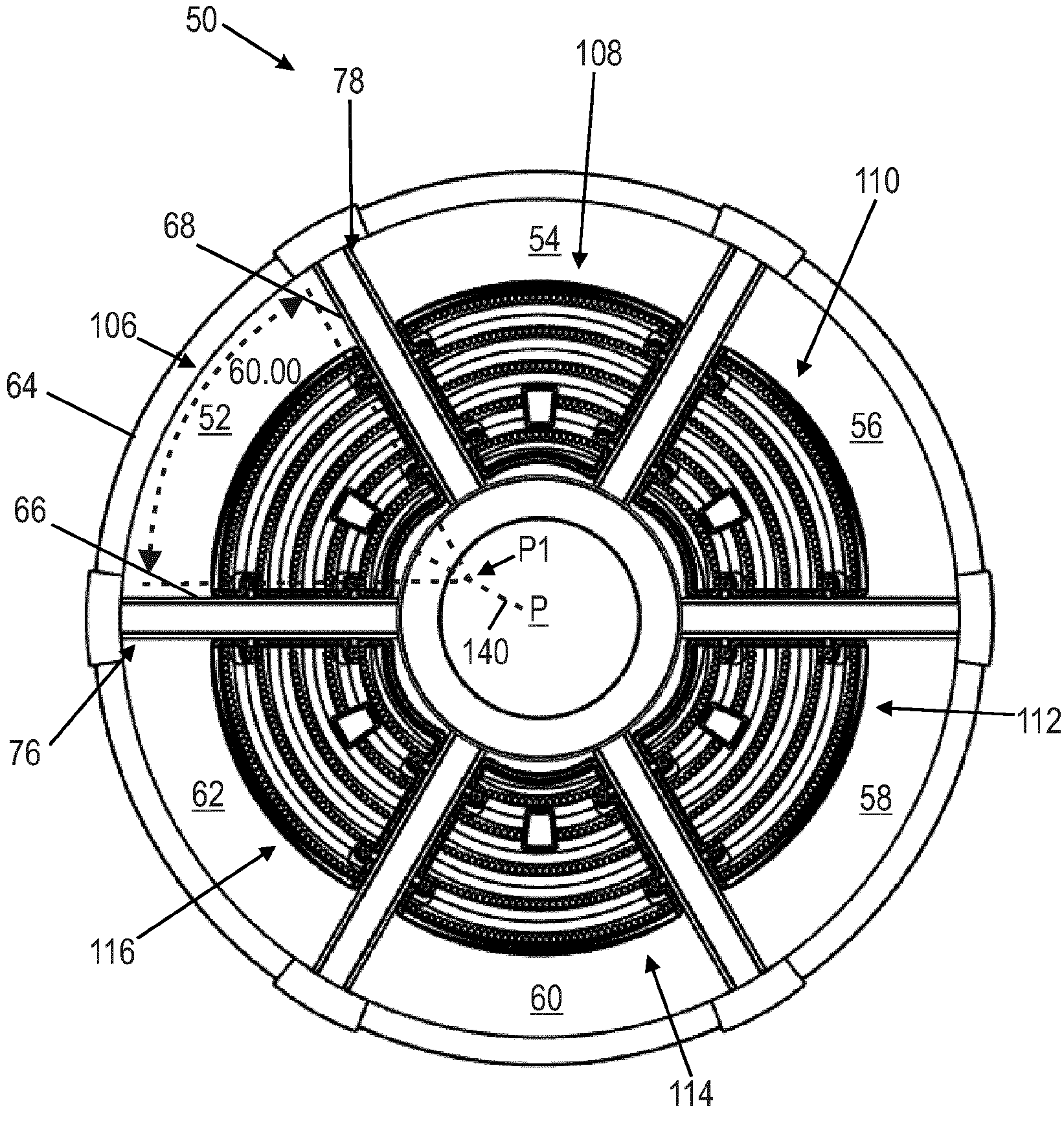
FIG. 5 is an example bottom view of the high output light fixture of FIG. 1, according to aspects of the present disclosure.

In the embodiment shown in FIGS. 1, 4, and 5, each lens is defined by a lens outer arc, lens radii, and a lens inner arc. Thus, lens 106 is defined by lens outer arc 120, first lens radius 122, second lens radius 124, and lens inner arc 126 as shown in FIG. 4. Lens outer arc 120 comprises end points 128 and 130 and a lens arc length L2 between end points 128 and 130. First lens radius 122 extends from end point 128 to point P1 as shown in FIG. 5. Second lens radius 124 extends from end point 130 to point P1 as shown in FIG. 5. Critically, point P1 is not coincident with center point P of light fixture 50 within cap 92 in FIG. 5. In other words, point P1 is positioned offset relative to center point P of light fixture 50.

As shown in FIGS. 4 and 5, lens inner arc 126 comprises end points 134 and 136, midpoint 138, and a lens inner arc length L3 extending from end point 134 to end point 136 through midpoint 138 along a continuous curve. As shown in FIG. 5, point P1 is arranged along imaginary line 140 that connects center point P of light fixture 50 to the midpoint 138 of inner arc 126.

Lens 106 is non-concentric with the modular heat sink structure 52 it is attached to. In embodiments, lens 106 is non-concentric with overall light fixture 50. As shown in FIGS. 1, 4, and 5, lens outer arc 120 is non-concentric with heat sink outer arc 64. Similarly, lens inner arc 126 is non-concentric with heat sink inner arc or segment 70. Lens radii 122 and 124 are also non-concentric with heat sink radii 66 and 68. The same non-concentricity holds true for the other lenses 108, 110, 112, 114, and 116 relative to the other respective modular heat sink structures 54, 56, 58, 60, and 62 and/or the overall light fixture 50.

As discussed above, the distance from the midpoint of channel 76, along heat sink outer arc 64, and to the midpoint of channel 78 forms one sixth or 60 degrees of the circumference of light fixture 50. By providing lenses 106, 108, 110, 112, 114, and 116 such that they are non-concentric to the overall light fixture 50, each lens creates rays that cover 60 degrees of the circumference of light fixture 50. In embodiments including four heat sink structures, each lens can be configured to create rays that cover 90 degrees of the circumference of light fixture 50. In embodiments including only two heat sink structures, each lens can be configured to create rays that cover 180 degrees of the light fixture 50. Each lens can be configured to support a beam angle having a narrow distribution in embodiments. In other embodiments, each lens can be configured to support a beam angle having a medium or wide distribution. As shown in embodiments, each lens is shaped as a truncated circular sector.

Conventional light fixtures with modular heat sink structures include lenses that are concentrically arranged relative to a center point of the light fixture to provide 360 degree coverage. Where a lens is provided for each LED, the gaps created by the modular heat sink structures (i.e., the channels) do not pose a problem. However, where a lens is provided for two or more LEDs for each heat sink structure, the gaps created by the modular heat sink structures (i.e., the channels) can cast shadows on task plane lighting. The improved systems and methods disclosed herein provide uniform lighting on task plane lighting without shadows using modular heat sink structures that form gaps or channels and non-concentric lenses. Applicant has recognized and appreciated that the gaps formed by the modular heat sink structures can be filled in by shortening the lens radii of each lens. Doing so, creates a larger coverage of the rays without changing the number of LEDs that are mounted and without adding cost. With lenses that are concentric with the modular heat sink structures and the overall light fixture (i.e., without the non-concentric lenses), each lens creates rays that cover only 34.91 degrees of the circumference of light fixture 50 in embodiments including six heat sink structures. Thus, all of the lenses in such an embodiment including concentric lenses would cover only approximately 210 degrees of the circumference of the light fixture.

As mentioned above, the light sources 53 in FIG. 3 are arranged along five arcs A1, A2, A3, A4, and A5. The same arrangement of light sources can be provided for each heat sink structure and corresponding lens. As shown in FIGS. 6 and 7, each of the lenses 106, 108, 110, 112, 114, and 116 includes five protruding arcs 150, 152, 154, 156, and 158. In other words, lens 106 includes five protruding arcs, lens 108 includes five protruding arcs, lens 110 includes five protruding arcs, lens 112 includes five protruding arcs, lens 114 includes five protruding arcs, and lens 116 includes five protruding arcs. Although there are five protruding arcs shown in the figures, it should be appreciated that any suitable number is contemplated depending on the arrangement of light sources. Each of the protruding arcs for each lens correspond to the position of arcs A1, A2, A3, A4, and A5 of LEDs shown in FIG. 3. Thus, protruding arc 150 of lens 106 is positioned to cover the LEDs arranged along arc A1, protruding arc 152 of lens 106 is positioned to cover the LEDs arranged along arc A2, protruding arc 154 is positioned to cover the LEDs arranged along arc A3, protruding arc 156 is positioned to cover the LEDs arranged along arc A4, and protruding arc 158 is positioned to cover the LEDs arranged along arc A5.

Figure 8B:
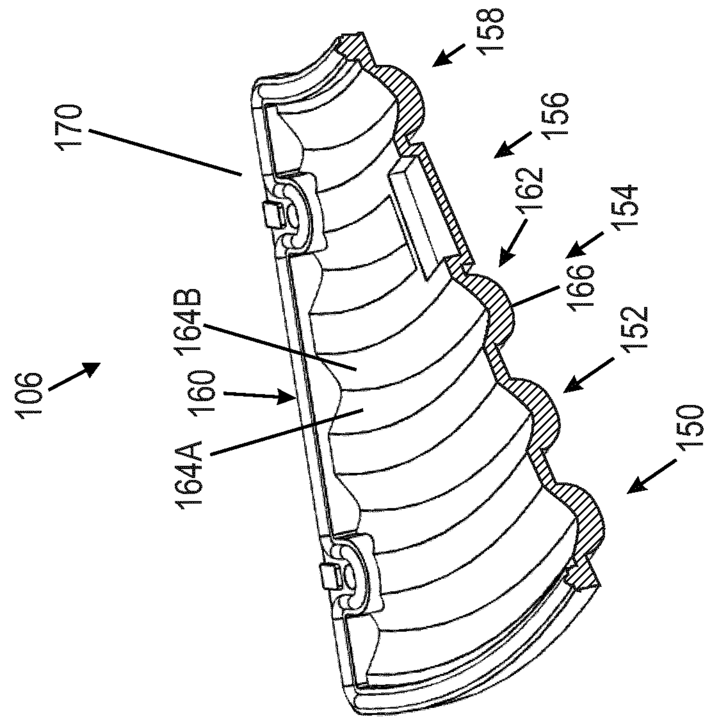
FIG. 8B shows an example cross-sectional view of the lens of FIG. 8A taken generally along box 8B in FIG. 8A.
Figure 8A:
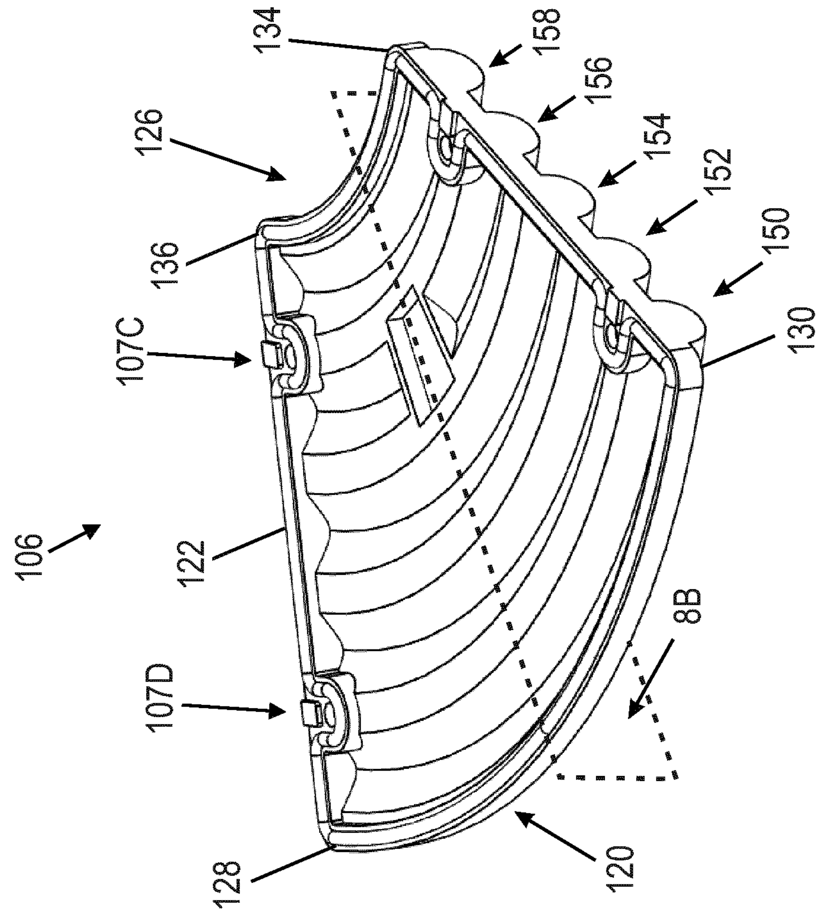
FIG. 8A shows an example bottom perspective view of the lens of FIG. 4.

A bottom perspective view of lens 106 is shown in FIG. 8A. A cross-sectional view of lens 106 is shown in FIG. 8B.

The following should be appreciated in view of FIGS. 8A and 8B. Protruding arcs 150, 152, 154, 156, and 158 form cavities around the LEDs on arcs A1, A2, A3, A4, and A5. Protruding arcs 150, 152, 154, 156, and 158 have inner surfaces that face the LEDs and outer surfaces that face away from the LEDs. In other words, the inner surfaces of protruding arcs 150, 152, 154, 156, and 158 face upward toward 20) electronics housing 51 when assembled and the outer surfaces of protruding arcs 150, 152, 154, 156, and 158 face downward away from electronics housing 51 when assembled. In embodiments, each of the inner surfaces of protruding arcs 150, 152, 154, 156, and 158 have a first profile 160 and each of the outer surfaces of protruding arcs 150, 152, 154, 156, and 158 have a second profile 162 as shown in FIG. 8B. In embodiments, profiles 160 and 162 are not the same nor are they mirror images of each other. Each profile 160 of the inner surfaces of protruding arcs 150, 152, 154, 156, and 158 is formed by two tapered surfaces 164A and 164B in embodiments. Each profile 162 of the outer surfaces of protruding arcs 150, 152, 154, 156, and 158 is formed by a single arcuate surface 166 in embodiments. The tapered surfaces 164A and 164B meet along an arc that is aligned with midpoints of arcuate 30) surface 166. As shown in FIG. 8B, tapered surfaces 164A and 164B are separated from arcuate surface 166 by a distance. Light from the LEDs can pass through profiles 162 and 164.

Only part of protrusion arc 156 is shown in FIG. 8B since that particular arc is divided into two segments and the cross-section is taken between the two segments in the embodiment depicted. Protrusion arc 156 is divided into two segments by an opening 170 in lens 106 to allow for a connection to the LEDs. It should be appreciated that the opening 170 can be arranged in any suitable shapes and configurations. For example, while opening 170 is shown in a rectangular shape, any other suitable shapes are contemplated. Additionally for example, in embodiments including four heat sink structures, each of the four lenses can include three protruding arcs instead of five and the equivalent opening 170 can be positioned in the center of lens 106 dividing a middle protruding arc of the three protruding arcs into two segments.

Figure 9:
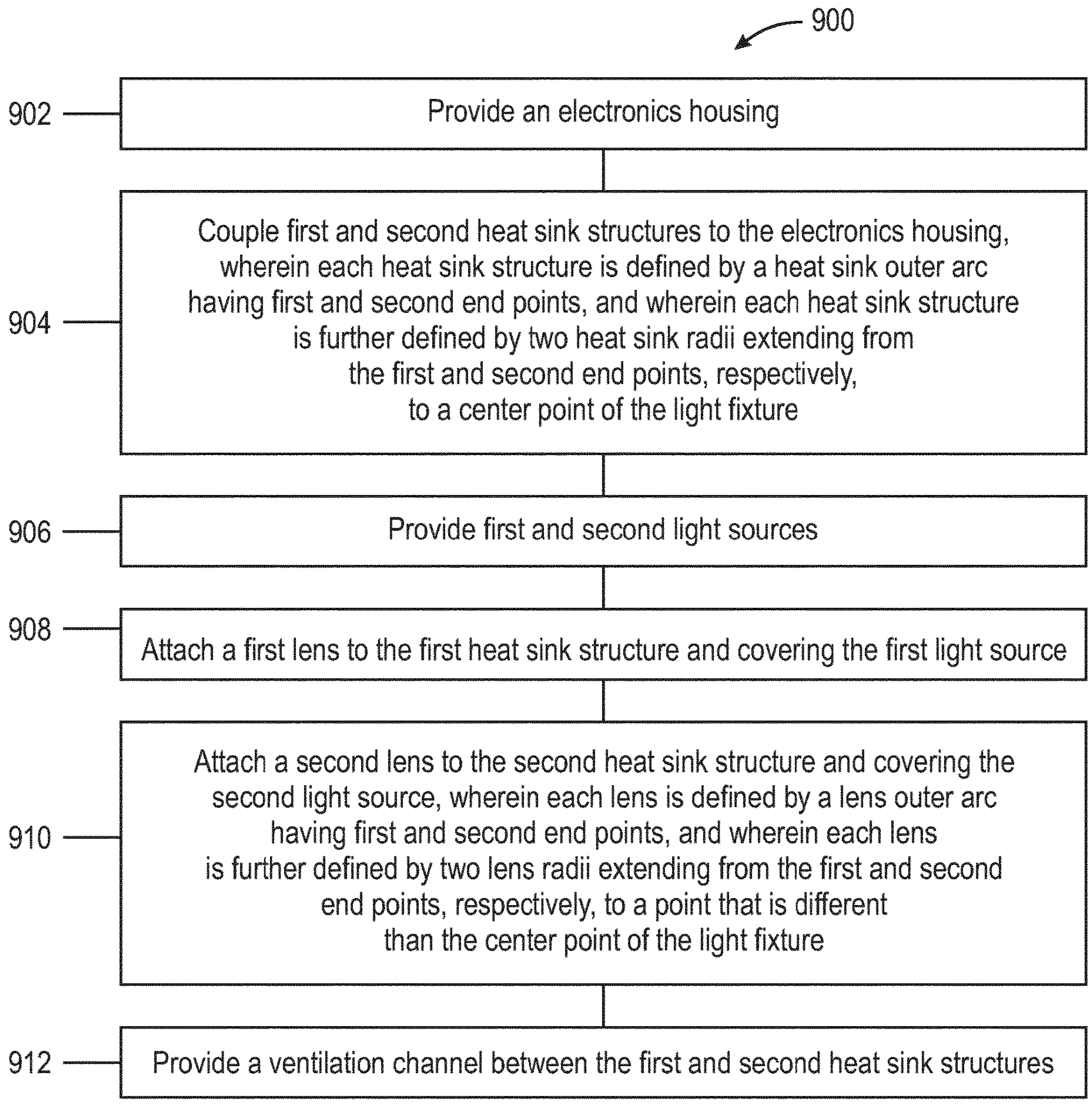
FIG. 9 shows an example process for manufacturing a high output light fixture with modular heat sink structures and lenses, according to aspects of the present disclosure.

In FIG. 9, an example process for manufacturing a high output light fixture with modular heat sink structures and lenses is provided. At step 902, an electronics housing (e.g., housing 51) is provided.

At step 904, first and second heat sink structures (e.g., structures 52, 54, 56, 58, 60, and 62) are coupled to the electronics housing. Each heat sink structure is defined at least in part by a heat sink outer arc (e.g., arc 64) having a heat sink outer arc length (e.g., length L1). The heat sink outer arc length has first and second end points (e.g., points 72 and 74). Each heat sink structure is further defined at least in part by two heat sink radii (e.g., radii 66 and 68) extending from the first and second end points, respectively, to a center point of the light fixture (e.g., point P).

At step 906, first and second light sources are provided (e.g., light sources 53).

At step 908, a first lens (e.g., lens 106) is attached to the first heat sink structure (e.g., heat sink structure 52). The first lens covers the first light source.

At step 910, a second lens (e.g., lens 108) is attached to the second heat sink structure (e.g., heat sink structure 54). The second lens covers the second light source. Each lens of the first and second lenses is defined at least in part by a lens outer arc (e.g., arc 120) having a lens outer arc length (e.g., length L2). The lens outer arc has first and second end points (e.g., points 128 and 130). Each lens of the first and second lenses is further defined at least in part by two lens radii (e.g., radii 122 and 124) extending from the first and second end points, respectively, to a point that is different than the center point of the light fixture (e.g., point P1).

It should also be understood that, unless clearly indicated to the contrary, in any methods claimed herein that include more than one step or act, the order of the steps or acts of the method is not necessarily limited to the order in which the steps or acts of the method are recited.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A light fixture, comprising:

an electronics housing;

first and second heat sink structures coupled to the electronics housing, wherein each heat sink structure of the first and second heat sink structures is defined at least in part by a heat sink outer arc having first and second end points, and wherein each heat sink structure is further defined at least in part by two heat sink radii extending from the first and second end points, respectively, to a center point of the light fixture;

first and second light sources;

at least two lenses comprising a first lens attached to the first heat sink structure and covering the first light source and a second lens attached to the second heat sink structure and covering the second light source, wherein each lens of the first and second lenses is defined at least in part by a lens outer arc having first and second end points, wherein each lens is further defined at least in part by two lens radii extending from the first and second end points, respectively, to a point that is different than the center point of the light fixture, and wherein each lens is further defined at least in part by an inner arc extending between the two lens radii; and a ventilation channel arranged between the first and second heat sink structures;

wherein the first or second lens is non-concentric with the light fixture.

2. The light fixture of claim 1, wherein the point that is different than the center point of the light fixture is arranged along an imaginary line connecting the center point of the light fixture to a midpoint of the inner arc.

3. The light fixture of claim 1, wherein the first lens is non-concentric with the first heat sink structure.

4. The light fixture of claim 3, wherein the second lens is non-concentric with the second heat sink structure.

5. The light fixture of claim 1, wherein the first lens is attached to a first base of the first heat sink structure on a first surface that faces away from the electronics housing and the second lens is attached to a second base of the second heat sink structure on a second surface that faces away from the electronics housing.

6. The light fixture of claim 1, wherein the point is radially outward of the center point of the light fixture.

7. A method for manufacturing a light fixture, comprising:

providing an electronics housing;

coupling first and second heat sink structures to the electronics housing, wherein each heat sink structure of the first and second heat sink structures is defined at least in part by a heat sink outer arc having first and second end points, wherein each heat sink structure is further defined at least in part by two heat sink radii extending from the first and second end points, respectively, to a center point of the light fixture;

providing first and second light sources;

attaching a first lens to the first heat sink structure and covering the first light source;

attaching a second lens to the second heat sink structure and covering the second light source, wherein each lens of the first and second lenses is defined at least in part by a lens outer arc having first and second end points, wherein each lens is further defined at least in part by two lens radii extending from the first and second end points, respectively, to a point that is different than the center point of the light fixture, and wherein the first lens or the second lens is further defined at least in part by an inner arc extending between the two lens radii; and providing a ventilation channel between the first and second heat sink structures;

wherein the first or second lens is non-concentric with the light fixture.

8. The method of claim 7, wherein the point that is different than the center point of the light fixture is arranged along an imaginary line connecting the center point of the light fixture to a midpoint of the inner arc.

9. The method of claim 7, wherein the first lens is non-concentric with the first heat sink structure and the second lens is non-concentric with the second heat sink structure.

10. The method of claim 7, wherein the first lens is attached to a first base of the first heat sink structure on a first surface that faces away from the electronics housing and the second lens is attached to a second base of the second heat sink structure on a second surface that faces away from the electronics housing.

11. The method of claim 7, wherein the point that is different than the center point of the light fixture is radially outward of the center point of the light fixture.

* * * * *